(12) United States Patent
Haupt et al.

(10) Patent No.: US 6,522,133 B1
(45) Date of Patent: Feb. 18, 2003

(54) CONTACTLESS FIELD SPIDER WITH HALL EFFECT SENSOR FOR DETECTING ROTATION OF AN ENCLOSED INNER TRANSMISSION COMPONENT TRANSMISSION

(75) Inventors: Josef Haupt, Tettnang (DE); Hans-Joachim Martin, Kressbronn (DE); Jürgen Mittelberger, Weissensberg (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/831,037

(22) PCT Filed: Nov. 4, 1999

(86) PCT No.: PCT/EP99/08416

§ 371 (c)(1), (2), (4) Date: May 3, 2001

(87) PCT Pub. No.: WO00/28333

PCT Pub. Date: May 18, 2000

(51) Int. Cl.[7] .......................... G01P 3/487; F16H 59/36
(52) U.S. Cl. .............................. 324/207.22; 324/207.2; 324/207.25; 324/174; 475/60
(58) Field of Search .................................. 324/173, 174, 324/207.22, 207.2, 207.25; 475/60, 62

(56) References Cited

U.S. PATENT DOCUMENTS

| 4,056,747 A | 11/1977 | Orris et al. ............... 310/155 |
|---|---|---|
| 4,586,401 A | 5/1986 | Nogle ...................... 74/752 A |
| H964 H | 9/1991 | Olson et al. ................. 324/174 |
| 5,136,511 A | * 8/1992 | Pannbacker ................... 701/76 |
| 5,157,966 A | 10/1992 | Lugosi et al. .............. 73/118.1 |
| 5,336,996 A | 8/1994 | Rusnak ..................... 324/207.2 |

FOREIGN PATENT DOCUMENTS

| DE | 27 15 426 | 11/1977 |
|---|---|---|
| DE | 36 20 884 A1 | 12/1987 |
| DE | 41 42 727 A1 | 7/1993 |
| EP | 0 443 937 A1 | 8/1991 |
| EP | 0 462 435 A1 | 12/1991 |
| EP | 0 687 914 A2 | 12/1995 |
| EP | 0 747 709 A1 | 12/1996 |
| EP | 0 838 683 A1 | 4/1998 |
| GB | 2 113 844 A | 8/1983 |

* cited by examiner

Primary Examiner—Walter E. Snow
(74) Attorney, Agent, or Firm—Davis & Bujold, P.L.L.C.

(57) ABSTRACT

The device for the contactless measurement of the rotational speed of a first part which rotates during operation and which is arranged inside a second part that either does not rotate or rotates at a rotational speed that is independent of the rotational speed of the first part, has an arrangement which generates a magnetic field and a magnetic field detector, wherein the arrangement which generates the magnetic field has a magnet ring (4) integrated in the inner part (1) and wherein the magnetic field detector is a Hall-effect sensor (3) situated in a housing (6) that surrounds both parts: the second part (2) consists of a non-magnetizable material.

3 Claims, 2 Drawing Sheets

Figure 1:
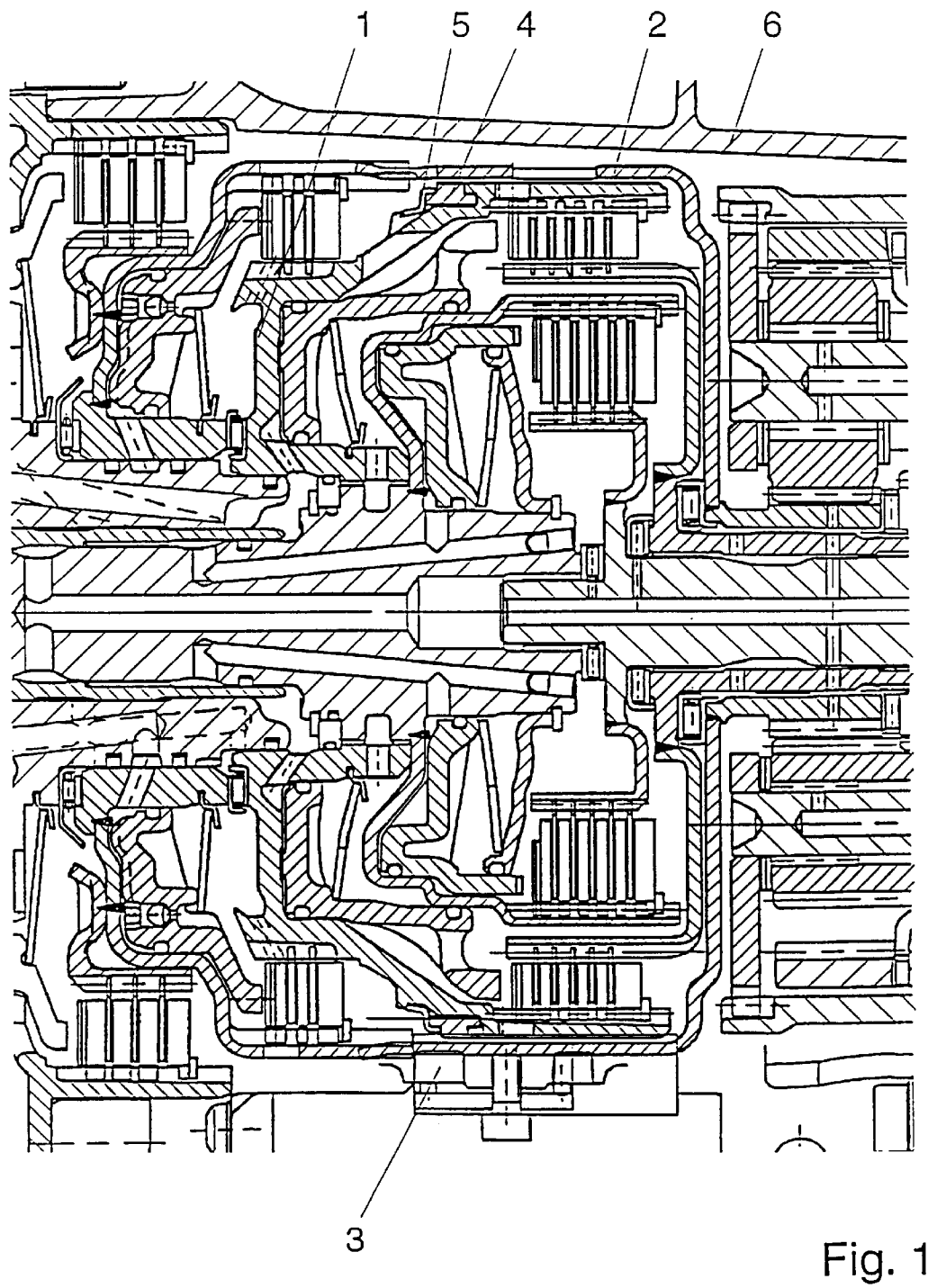

CONTACTLESS FIELD SPIDER WITH HALL EFFECT SENSOR FOR DETECTING ROTATION OF AN ENCLOSED INNER TRANSMISSION COMPONENT TRANSMISSION

FIELD OF THE INVENTION

This invention relates to a device for the contactless measurement of the rotational speed of a first part which rotates during operation and is situated within a second part which either does not rotate or rotates at a rotational speed independent of the rotational speed of the first part.

BACKGROUND OF THE INVENTION

The device is especially adequate for measuring the rotational speed, of a cylinder connected with the rotating turbine of an automatic transmission and is situated within a likewise rotating concentric pot, both parts being surrounded by a housing and the device having an arrangement that generates a magnetic field and a magnetic field detector.

Parts of an automatic transmission-like cylinders, which are connected with the turbine and, accordingly, rotate at the rotational speed of the turbine, are often located within other parts which are: either stationary or rotate at a rotational speed independent of the rotational speed of the turbine.

DE-A 36 20 884 has disclosed a device for detecting rotational speed and direction or rotation of a rotating part wherein the rotating part is, for example, a shaft or a rack with teeth formed of ferromagnetic material. A differential sensor of the magnetic field delivers input voltages for amplifiers on which band pass filters and comparators are mounted. By using rows of teeth, having identical spacings and gaps, there can be measured both the speed of movement and the direction of movement. Howeer, it is not possible with this known device to measure the rotational speed or direction of rotation of a rotating part which is surrounded by a second rotating or stationary part in which the measuring signal has to penetrate this second part.

EP-B 462 435 concerns an arrangement for detecting the rotational speed of a part rotating during, operation which has, in a peripheral direction, at least an unevenness with a rotational speed sensor device which detects the movement of the unevenness wherein a means generating a magnetic field and a magnetic field detector are combined to form a structural unit in which between the rotational speed sensor device and the rotating part, a wall is provided so that the rotational speed of the rotating part is detected through the wall. The magnetic field generator is a permanent magnet and the detector a magnetic field detector working according to the magnetic field principle. The rotational speed sensor is located in a bore of a housing of an automatic transmission of a motor vehicle which has an externally toothed first clutch bell housing and a second clutch bell housing situated between the rotational speed sensor and the first clutch bell housing. The magnetic field detector is especially sensitive in a direction determined by its shortest distance from the first clutch bell housing. In this manner, it is possible to detect through the rotating second clutch bell housing the change produced by the first clutch bell housing in the magnetic field generated by the permanent magnet. In this known arrangement, the basic material of the second clutch bell housing is demagnetized at least in sectors in peripheral direction in an area opposite to the magnetic field detector or is provided with a magnetization that generates a poled magnetic field. The magnetic field generator sits upon the rotating inner part while the magnetic field detector is situated within the housing.

SUMMARY OF THE INVENTION

The problem to be solved by this invention is, in a specially simple and reliable manner and without need of additional space, to measure the rotational speed of a rotating part situated within one other part which is either stationary or rotates at a second rotational speed independent of the first rotational speed, the first and the second parts being disposed concentrically to each other.

The inventive principle consists in providing as contactlessly working magnetic-field sensitive sensor a Hall-effect sensor with which the rotational speed of a rotating cylinder with integrated field spider is detected through a likewise rotating pot disposed concentrically thereto which is made from a non-magnetizable material. Since the field spider is entirely integrated in the first rotating part, i.e. the rotating cylinder, and since the Hall-effect sensor is integrated in the wall of the housing surrounding both parts, no additional space is required.

The inventive device is especially suitable for automatic transmissions of motor vehicles in which the first part is a cylinder firmly connected with the turbine and whose rotational speed is measured for regulation purposes.

BRIEF DESCRIPTION OF THE DRAWING(S)

Figure 2:
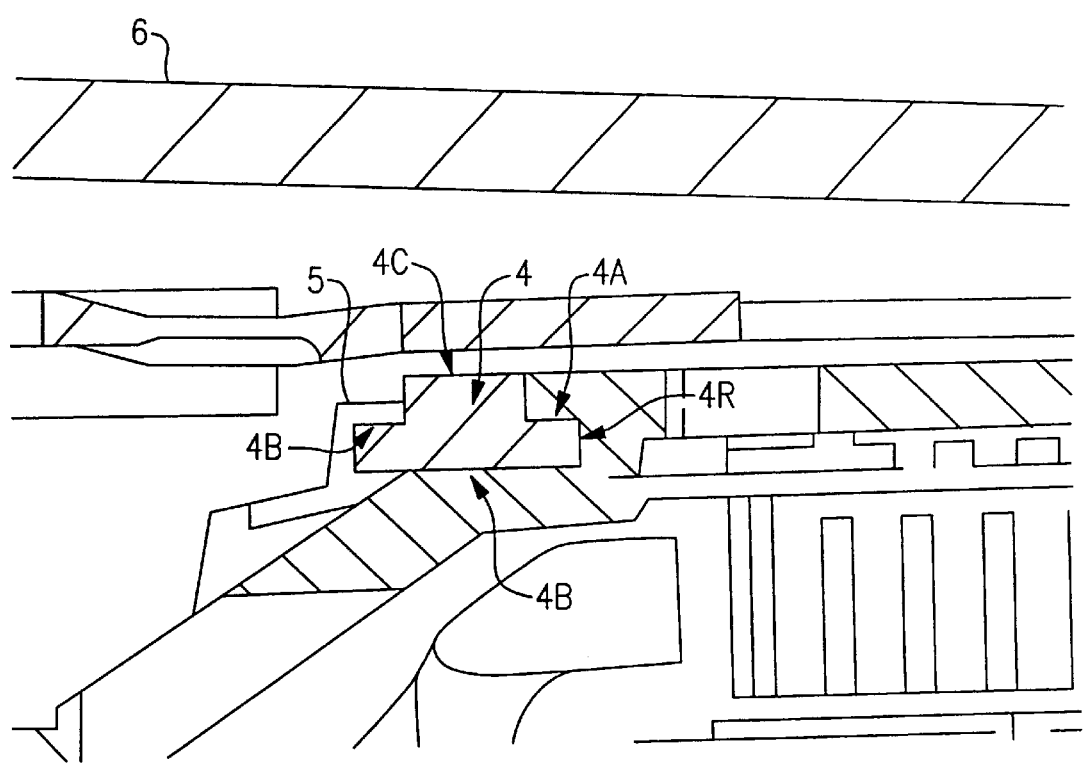

The invention is explained in detail below with reference to the accompanying drawings wherein:

FIG. 1 is an illustration of a transmission in which the present invention is implemented; and, FIG. 2 is an enlarged view of the portion of FIG. 1 containing the field spider of the present invention and illustrating the cross-section of the field spider.

DETAILED DESCRIPTION OF THE INVENTION

Since each automatic transmissions are well known, only the parts needed for understanding the invention have been provided with reference numerals.

In this transmission, the housing of which is designated with 6, a first part is provided in the form of a cylinder 1 firmly connected with the turbine shaft and whose rotational speed is to be contactlessly measured. The part 1 is concentrically surrounded by a second part 2 in the form of a pot. The second part 2 is either stationary or rotates at a second rotational speed independent of the rotational speed of the first part 1.

According to the invention, for measuring the rotational speed of the cylinder 1 through the pot 2, a magnet ring 4 is provided which is fully integrated in the cylinder 1, the magnet ring having the shape of a field spider which is preferably an annular hard ferrite bonded with plastic having a radial magnetization. A field spider with 18 pole pairs has provided specially advantageous.

As illustrated in FIG. 2, which is an enlarge view of the portion of FIG. 1 coating the cross-section view of field spider 4, the field spider 4 has a substantially T-shaped cross-section wherein an arm 4A of the transverse bar 4B of the T meshes in a corresponding recess 4R in the cylinder 1 in such a manner that the longitudinal bar 4C of the T extends in direction of the housing 6 up to the surface of the cylinder 1. After insertion in the recess of the cylinder 1, the field spider 4 is held by means of a guard ring 5 enclosing a second arm 4D of the transverse bar 4B, wherein guard ring 5 is attached to the cylinder 1 and is made of a non-magnetizable material such as an austenitic material of aluminum.

In a recess in the housing 6 is provided a magnetic field detector 3 in the form of a Hall-effect sensor wherein the Hall-effect sensor is preferably a bi-polarly working Hall-effect sensor IC which delivers a digital output signal. Between the outer side of the cylinder 1 provided with the field spider 4 and the Hall-effect sensor 3 is located the second part 2 in the form of a pot, the part consisting of a non-magnetizable material, preferably an austenitic material, so that the rotational speed of the rotating cylinder 1 can be measured by the Hall-effect sensor 3 through the second part 2.

With a working distance of 6 mm, for ex., between field spider 4 and sensor 3 and a field spider 4 with 18 pole pairs, a maximum flow density is obtained in 6 mm distance of +/−12 mT.

Such an inventively constructed device is adequate for a temperature range of from −40 to +150° C., and establishes the rotational speed of the rotating first part 1 with more accuracy of the cylinder. A field spider in the form of a plastic-bonded annular hard ferrite magnet with 18 pole pairs results in a magnetic field that can be placed precisely enough with regard to angular and radial offset at minimum manufacturing expense and more assembly security so that such a field spider is adequate for mass production.

The field spider with the T-shaped cross-section makes the two-side passing and support of the cylinder in the recess possible and thus resists the strong centrifugal forces that appear. The assembly of the field spider is easy and safe to process; neither an adjustment process nor a locating process is needed.

In one development the magnet ring is cemented with the guard ring.

The fixture with which the field spider is held in the cylinder can be provided with a simple snap fastener whereby is also obtained an optimum support of the guard ring and thus an axial security regarding the centrifugal force appearing.

In one other development the guard ring is calked with the cylinder in order to ensure freedom of play. This is necessary in the case of great engine vibrations.

Reference Numerals 1 cylinder
2 pot
3 Hall-effect sensor
4 field spider
5 fixture
6 housing

What is claimed is:

1. A rotation detector for use in a transmission for determining the rotation of a cylinder enclosed and rotating within an outer concentric part of the transmission, the outer concentric part consisting of a non-magnetizable material and having a generally solid wall in the region of the rotation detector, comprising:

a Hall-effect magnetic field sensor stationarily situated in a recess in a wall of a housing concentrically spaced apart from an outer periphery of the outer concentric part and in the region of the field sensor, and a magnetic field generator including a magnet ring located concentrically with an outer periphery of the cylinder and having a shape of a field spider, the magnet ring having a substantially T-shaped cross-section having a longitudinal bar and a transverse bar having a first arm and a second arm, the first arm and the second arm extending outward at generally right angles from a first side and a second side of the longitudinal bar, a first arm of the magnet ring extending into a corresponding circumferential recess in the cylinder, the recess being spaced inwards from the outer periphery of the cylinder and extending axially to the cylinder so that the magnet ring is connected to the cylinder to resist centrifugal forces resulting from rotation of the cylinder, and the longitudinal bar of the spider extending from the recess and towards the outer periphery of the cylinder to locate the magnetic field towards the periphery of the cylinder and the field sensor.

2. The rotation detector according to claim 1, wherein the magnet ring is fixed in a radial and an axial direction in the recess in the cylinder by a guard ring made of non-magnetizable material, the guard ring being located concentrically with the magnet ring and enclosing the second arm of the magnet ring and connected to the cylinder.

3. The mechanism according to claim 1, wherein the magnet ring consists of a radial magnetized plastic-bonded hard ferrite.

* * * * *